United States Patent Office 3,412,433
Patented Nov. 26, 1968

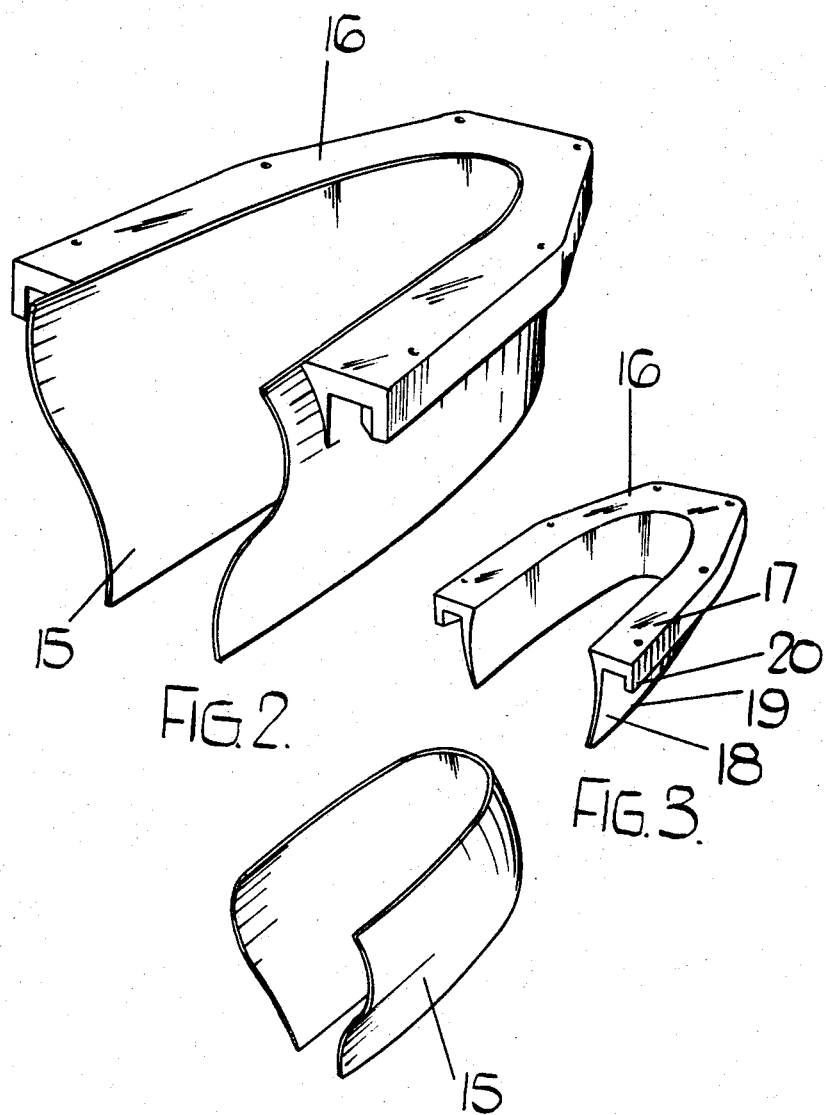

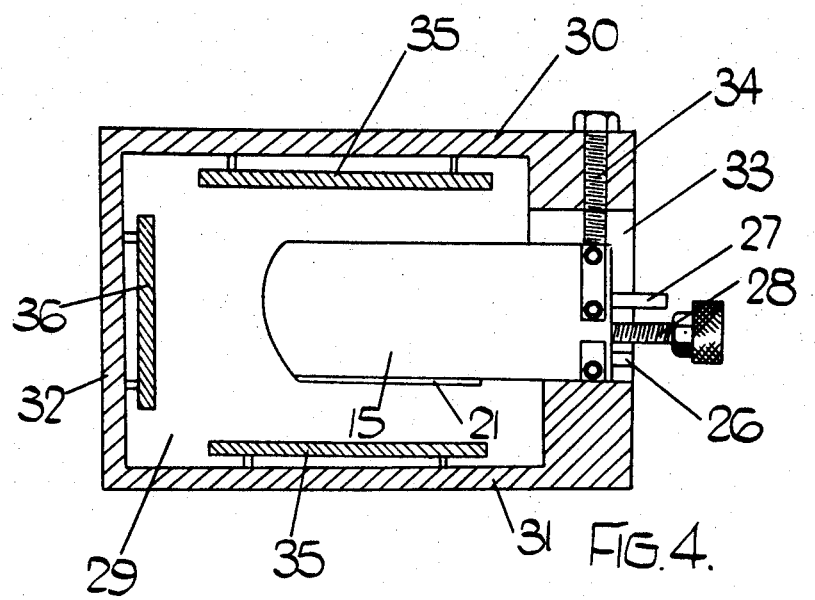
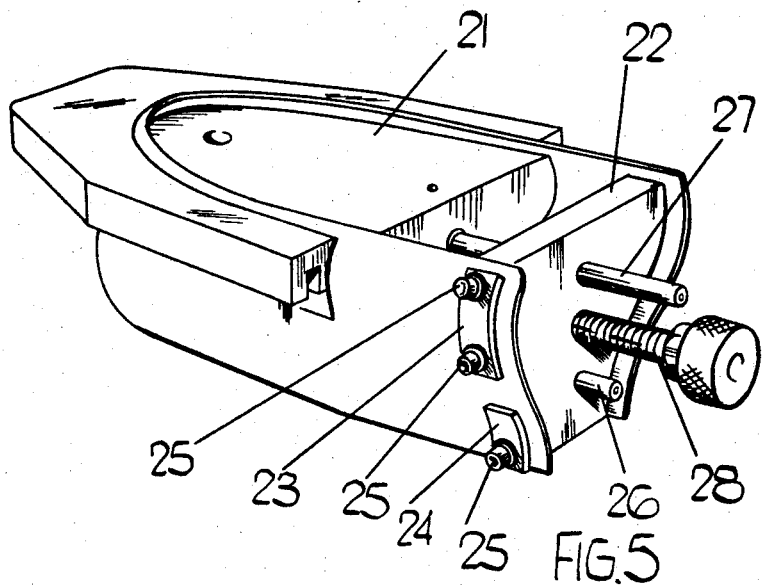

3,412,433
APPARATUS FOR USE IN LASTING FOOTWEAR
George Trevor Ralphs, Oadby, Leicester, and Derek Peter Hull, Coalville, Leicestershire, England, assignors to Ralphs Unified Limited, Leicester, England, a British company
Filed Nov. 5, 1965, Ser. No. 506,505
Claims priority, application Great Britain, Nov. 5, 1964, 45,094/64
5 Claims. (Cl. 18—34)

This invention is for improvements in or relating to apparatus for use in lasting footwear and has for one of its objects to provide an effective and durable form of construction for a component of a shoe end mould. The word "shoe" is used herein wherever the context so permits in a broad sense to include outer footwear generally.

In accordance with the invention there is provided a mould component for a shoe end mould such as is used to embrace the upper material at one end of a shoe, comprising a lining sheet of polytetrafluoroethylene (P.T.F.E.) or similar polyfluorocarbon material moulded to the shape of a shoe end upper part, and elastomeric material moulded to form a supporting means for the lining sheet moulded around the latter and bonded to it. This form of mould component is found to be particularly effective for mounting on the inside of a shoe end mould to grip the upper material against a form without injury to the upper material, during the performance of a combined shaping and lasting operation. The component may be mounted in a mould such as is described in either of our patent applications Ser. Nos. 407,778, filed Oct. 30, 1964, now Patent No. 3,256,543 and 459,727, filed May 28, 1965, now Patent No. 3,358,335.

In practising the invention the elastomeric material from which the supporting means is formed is conveniently polyurethane, a particularly useful material being that sold under the registered trademark "Prescollan." Other materials having similar properties may be used.

The invention includes a mould component for a shoe end mould which is made by the steps of moulding a sheet of polyfluorocarbon material (e.g., P.T.F.E.) under tension to a required shape, heating the material to an appropriate temperature to neutralise its recovery power, and afterwards moulding around said sheet elastomeric material to form a supporting means for the sheet and simultaneously bonding the elastomeric material to the sheet. Conveniently the sheet of polyfluorocarbon material is initially treated on the surface which is to be outermost with a substance which facilitates subsequent bonding and the bonding of the elastomeric material to it is effected with the aid of an appropriate bonding liquid. The treatment procedure to facilitate bonding may be that known as sodium etch treatment.

A specific example of a convenient way of practising the invention will now be described with reference to the accompanying drawings in which:

FIGURE 2 is a perspective view of a mould component in accordance with the invention for use in the said mould;

FIGURE 3 is an exploded view on a reduced scale of the parts shown in FIGURE 2;

FIGURE 4 is an elevation view in central cross-section of an oven such as can be used for heating part of the mould unit; and FIGURE 5 is a perspective view of the mould unit mounted on a stretching device.

Figure 1:
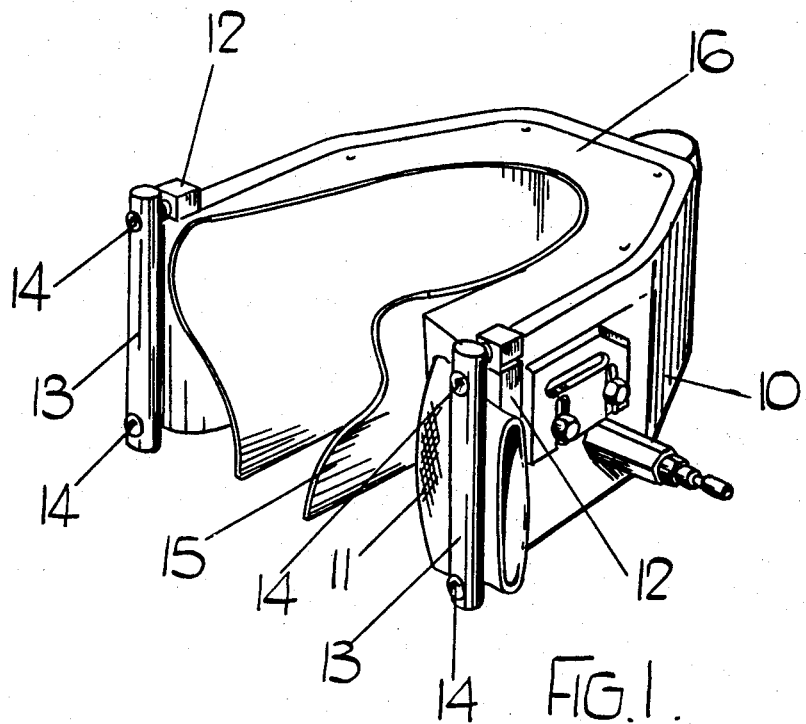
FIGURE 1 is a perspective view of an assembled mould such as is used to embrace the upper material at one end of a shoe in the performance of moulding and lasting operations on the shoe upper.

Referring firstly to FIG. 1 the mould assembly shown comprises an outer support member 10 of generally horse shoe shape in plan view with its side portions capable of width-wise separation by flexing or pivoting. The outer member 10 embraces an inflatable bag 11 consisting of an open ended flexible tube the end parts of which are clamped in place and closed between bars 12 and 13 fitted with clamping screws 14. The inflatable bag 11 surrounds a mould unit formed by a lining sheet 15 and an upper supporting means 16 which is shaped to fit snugly within the outer support 10. The lining sheet 15 is formed of polytetrafluoroethylene (P.T.F.E.) or similar polyfluorocarbon material moulded to the shape of a shoe end upper part, and the supporting means 16 is formed of elastomeric material for example polyurethane, a particularly useful material being sold under the registered trademark "Prescollan."

FIGS. 2 and 3 show the mould component consisting of the parts 15 and 16 in greater detail and it will be seen that the sheet 15 is a sheet of plain material of appropriate dimensions which has been shaped partly to bulbous form to conform to the shape of a shoe end part, for example showing a sheet shaped to the form of the exterior of a shoe heel between the feather line and the top line of the shoe. The supporting means 16 comprises a flange part 17 to extend outwardly around the top part of the component and a tapered lip 18 extending from the inner boundary of flange 17 around the mould and tapered to a thin edge 19. The flange part 17 has a down turned rim 20 at its outer edge.

In a convenient procedure for practising the invention there is provided a stretching device comprising a block 21, FIG. 5, to the external shape of which the sheet material 15 is to be formed, the block 21 being of the shape required for moulding a shoe end upper part, and a stretching plate 22 to opposite sides of which the polyfluorocarbon material 15 can be attached. Attachment is effected by means of two clamping plates 23, 24 at each side of the stretching device which are held down by screws 25 engaging through holes in the material 15 into the stretching plate 22. For guidance there are steady pins 26 and 27 extending from the block 21 and passing through apertures in the plate 22 which is fitted with a screw device 28 for urging it away from the block 21.

In the procedure of producing the mould component a sheet of material to form the part 15 which may be P.T.F.E. sheet such as that soled under the registered trademark "Teflon" has its surface that is to be outermost subjected all over or only to that part to which the supporting member 16 is to be applied, to sodium etch treatment before being applied to the stretching device 21, 22 and stretched to the form required. After the sheet material 15 has been applied to the stretching device and clamped by means of the plates 23, 24 the screw device is manipulated to apply stretching force to the material 15 so as to tend to cause it to conform to the shape of the block 21. Whilst on the form 21 the material 15 is then subjected to heat in an oven or heat applied by immersion of the stretching device with the sheet material 15 in a heated liquid such as a suitable oil. The heating effect assists the sheet material 15 to be caused to conform to the shape of the block 21 and if necessary during the heating procedure the screw device 28 is manipulated further to ensure that the proper shape is secured in the material 15.

FIG. 4 shows in cross-section a suitable oven for use in this way, the oven having side walls one of which is indicated at 29 and top and bottom walls 30 and 31 and an end wall 32. FIG. 4 shows how the stretcher unit with the sheet material 15 thereon is mounted in the oven being inserted through an opening 33 in its front wall and held in place by a screw 34 pressing against the top of the stretching plate 22. Whilst subjected to a heated atmosphere in the oven obtained by means of electrical heating elements shown at 35 and 36, conveniently at a temperature of 225° C. to 230° C., the sheet material 15 is subjected to a stretching force to conform it to the shape of the block 21. The arrangement of FIG. 4 illustrates the heating of the sheet material 15 by means of a heated atmosphere. If desired the heating effect may instead be obtained by immersion of the matrial 15 whilst on the stretching device 21, 22 in a heating liquid either inside an oven such as shown in FIG. 4 or in a heat insulated container.

After the sheet material 15 has been stretched to the shape of the block 21 by the aid of heat treatment, and preferably heat treated for a period of a few hours, it is transferred whilst remaining held in the stretched form on the stretching device to a mould for application of the supporting means 16 which is applied to it by a moulding operation. The outer etched surface of the material 15 is first coated with a bonding liquid which for P.T.F.E. sheet may be isocyanate modified resins. The elastomeric material to form the supporting means 16 is thereupon poured into the mould to mould it around the stretched lining sheet by an orthodox moulding procedure and simutlaneously bond it to the sheet. The mould causes the elastomeric material to occupy the required shape in which it becomes set and firmly bonded to the lining material 15. The moulded assembly is then cured on the form on the stretching device by heat treatment at a lower temperature for an extended period of a few days. Afterwards the clamping plates 23 and 24 are removed and the mould unit consisting of the parts 15 and 16 removed from the stretching device. The projecting end parts of the lining sheet 15 are then trimmed to the required edge contour leaving a wing like portion projecting from the supporting means 16.

The distortion of the lining sheet 15 of P.T.F.E. has tendency to set up internal stresses in the material. Unless these are relieved or neutralised the moulded shape of the lining material may prove to be insufficiently permanent. Therefore it is desirable to subject the stretched and shaped lining material 15 whilst on the block 21 to treatment which will have the effect of relieving such stresses. This treatment may consist of subjecting the lining material whilst in its fullest stretched condition after being heated as aforesaid, to further heat treatment, for example in an oven, with its temperature maintained at a constant level of 320° C. for a period of a few hours. Alternatively the treatment to which the lining material 15 becomes subjected during the moulding on of the elastomeric material forming the supporting means 16 may be found to be sufficient to relieve the stress in the lining material 15.

By the procedure in accordance with the invention mould components suitable for incorporation in moulds as described in patent applications Ser. Nos. 407,778, filed Oct. 30, 1964 and 459,727 filed May 28, 1965, can be conveniently produced for use in shaping the end portions of shoe uppers to appropriate forms during the performance of shoe end lasting operations thereon.

What we claim is:

1. A component for a shoe end mould comprising a lining sheet of polyfluorocarbon material moulded to the shape of a shoe end upper part and a supporting band of elastomeric material extending around an edge part of the lining sheet corresponding to the region of the featherline of a shoe and moulded to the shape of the lining sheet at that place and bonded to it.

2. A component according to claim 1 wherein the polyfluorocarbon material is polytetrafluoroethylene (P.T.F.E.).

3. A component according to claim 1 wherein the elastomeric material forming the supporting band is polyurethane.

4. A component according to claim 1 wherein the supporting band presents a flanged part to extend outwardly around the part of the component corresponding to the featherline of a shoe and a tapered lip extending from the inner part of the flanged part around the mould and tapered to a thin edge, said tapered lip being bonded to the lining sheet.

5. A component according to claim 1 wherein the lining sheet has wing parts extending beyond the ends of the supporting band.

References Cited

UNITED STATES PATENTS

| | | | |
|---|---|---|---|
| 3,189,946 | 6/1965 | Ciaio | 18—345 X |
| 3,358,335 | 12/1967 | Ralphs et al. | 18—345 |

J. HOWARD FLINT, JR., *Primary Examiner.*